(12) United States Patent
Meyer-Roscher et al.

(10) Patent No.: US 6,767,954 B2
(45) Date of Patent: Jul. 27, 2004

(54) LATENTLY CROSSLINKING AQUEOUS DISPERSIONS CONTAINING A POLYURETHANE

(75) Inventors: Bernd Meyer-Roscher, Neustadt (DE); Andre Burghardt, Bobenheim-Roxheim (DE); Ulrike Licht, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 200 days.

(21) Appl. No.: 10/113,296

(22) Filed: Apr. 2, 2002

(65) Prior Publication Data

US 2002/0198313 A1 Dec. 26, 2002

(30) Foreign Application Priority Data

Apr. 5, 2001 (DE) .......................................... 101 16 990

(51) Int. Cl.[7] .............................. C08J 3/00; C08K 3/20; C08L 75/00; C08F 8/30; C08F 283/04
(52) U.S. Cl. .................... 524/507; 428/423.1; 524/591; 524/839; 524/840; 525/123; 525/127; 525/455
(58) Field of Search ................................ 524/507, 591, 524/839, 840; 525/123, 127, 455; 428/423.1

(56) References Cited

U.S. PATENT DOCUMENTS

| | | | |
|---|---|---|---|
| 4,663,377 A | | 5/1987 | Hombach et al. |
| 4,910,339 A | | 3/1990 | Henning et al. |
| 4,977,219 A | | 12/1990 | Watson, Jr. |
| 5,006,413 A | * | 4/1991 | Den Hartog et al. ....... 428/463 |
| 5,117,059 A | | 5/1992 | Tylor |
| 5,574,083 A | | 11/1996 | Brown et al. |
| 6,599,975 B1 | * | 7/2003 | Licht et al. ................. 524/591 |

FOREIGN PATENT DOCUMENTS

| | | |
|---|---|---|
| DE | 197 33 044 | 2/1999 |
| DE | 198 28 251 | 12/1999 |
| EP | 198 343 | 10/1986 |
| EP | 206 059 | 12/1986 |
| EP | 792 908 | 9/1997 |
| WO | WO 99/06460 | * 2/1999 |

* cited by examiner

Primary Examiner—Patrick D. Niland
(74) Attorney, Agent, or Firm—Oblon, Spivak, McClelland, Maier & Neustadt, P.C.

(57) ABSTRACT

Latently crosslinking aqueous polyurethane dispersions contain

I) a disperse phase (P.I) containing
   Ia) a polyurethane (Ia) which, in addition to hydrophilic groups which produce water dispersibility, carries carbodiimide groups and substantially no carboxyl groups or
   Ib) a physical mixture of
   Ibi) a polyurethane (Ibi) which carries hydrophilic groups which produce water dispersibility and carries substantially no carbodiimide or carboxyl groups, and
   Ibii) a carbodiimide (Ibii) which carries substantially no hydrophilic groups which produce water dispersibility, and II) a disperse phase (P.II) containing another polymer (II) which carries substantially no carbodiimide groups and is substantially derived from
   II.1) from 30 to 99.98% by weight of main monomers selected from $C_1$- to $C_{20}$-alkyl (meth)acrylates, vinyl esters of carboxylic acids of up to 20 carbon atoms, vinylaromatics of up to 20 carbon atoms, ethylenically unsaturated nitriles, vinyl halides and aliphatic hydrocarbons having 2 to 8 carbon atoms and 1 or 2 double bonds,
   II.2) from 0.01 to 20% by weight of a carboxylic acid having an olefinic double bond and
   II.3) from 0.01 to 10% by weight of a monomer differing from the monomers II.1 and II.2 and selected from the group consisting of N-methylol (meth)acrylamide (AMOL), (MAMOL), acetoacetoxyethyl (meth)acrylate, diacetone (meth) acrylamide, glycidyl (meth)acrylate, ureido (meth) acrylate and (meth)acrylic anhydride, and
   II.4) if required, monomers differing from (II.1), (II.2) and (II.3) and capable of free radical polymerization.

12 Claims, No Drawings

LATENTLY CROSSLINKING AQUEOUS DISPERSIONS CONTAINING A POLYURETHANE

The present invention relates to latently crosslinking aqueous polyurethane dispersions containing I) a disperse phase (P.I) containing Ia) a polyurethane (Ia) which, in addition to hydrophilic groups which produce water dispersibility, carries carbodiimide groups and substantially no carboxyl groups or Ib) a physical mixture of Ibi) a polyurethane (Ibi) which carries hydrophilic groups which produce water dispersibility and carries substantially no carbodiimide or carboxyl groups, and Ibii) a carbodiimide (Ibii) which carries substantially no hydrophilic groups which produce water dispersibility, and II) a disperse phase (P.II) containing another polymer (II) which carries substantially no carbodiimide groups and is substantially derived from II.1) from 30 to 99.98% by weight of main monomers selected from $C_1$- to $C_{20}$-alkyl (meth)acrylates, vinyl esters of carboxylic acids of up to 20 carbon atoms, vinylaromatics of up to 20 carbon atoms, ethylenically unsaturated nitriles, vinyl halides and aliphatic hydrocarbons having 2 to 8 carbon atoms and 1 or 2 double bonds, II.2) from 0.01 to 20% by weight of a carboxylic acid having an olefinic double bond and II.3) from 0.01 to 10% by weight of a monomer differing from the monomers II.1 and II.2 and selected from the group consisting of N-methylol (meth)acrylamide (AMOL), (MAMOL), acetoacetoxyethyl (meth) acrylate, diacetone (meth)acrylamide, glycidyl (meth) acrylate, ureido (meth)acrylate and (meth)acrylic anhydride, and II.4) if required, monomers differing from (II.1), (II.2) and (II.3) and capable of free radical polymerization.

The present invention furthermore relates to the use of the novel aqueous dispersions as an impregnating composition, coating material or adhesive and to the impregnated, coated or adhesively bonded articles produced using these dispersions.

Aqueous dispersions which contain a polyurethane in dispersed form are generally known. In order for coatings produced from the polyurethane to have particularly good mechanical properties, a crosslinking component is added to these dispersions. It is particularly desirable for the crosslinking agent to increase the molecular weight of the polyurethane only when the polyurethane dispersion has formed a film after application to the workpiece to be coated. Under these circumstances, films which have particularly high cohesion are obtained since the polymer molecules of a dispersion particle can then also be linked to the polymer molecules of another neighboring dispersion particle via a covalent bond.

Particularly good cohesion of the films is required, for example, in the adhesive sector, particularly when the adhesive bond is subjected to mechanical load under the action of heat.

In order to obtain adhesive bonds which still have sufficient strength even under these conditions, for example EP-A-206059 recommends adding a water-emulsifiable polyisocyanate as a crosslinking agent to the dispersions shortly before they are processed as an adhesive.

However, the disadvantage of these two-component systems is that the pot life, i.e. the period in which these systems can be processed after they have been mixed, is subject to narrow limits. Since the two-component system cannot be stored over a relatively long period and the processor has to specially prepare a specific amount of adhesive which he can process within a working cycle, more work is required on the part of the processor of the adhesives in the case of two-component systems than one-component systems.

U.S. Pat. Nos. 4,977,219 and 5,117,059 disclose mixtures of an aqueous dispersion of a carbodiimide and an aqueous dispersion of an emulsion polymer having carboxylate groups, the first-mentioned dispersion being stabilized with the aid of conventional surfactants.

U.S. Pat. No. 5,574,083 relates to a mixture of an aqueous dispersion of carbodiimides, the dispersion being stabilized by hydrophilic polyalkylene oxide radicals which the carbodiimides carry. These dispersions are mixed with aqueous dispersions of an emulsion polymer having carboxylate groups.

EP-A-792908 discloses mixtures of an aqueous dispersion of a carboxyl-carrying polyurethane and an aqueous dispersion of a carbodiimide, the dispersion being stabilized with the aid of conventional surfactants.

EP-A-198343 relates to polyurethanes having carbodiimide groups and having hydrophilic groups which permit water dispersibility. According to said patent, the carboxyl-containing polymer dispersions are added and result in a crosslinking effect in the polymers.

According to the 5 abovementioned publications, the carbodiimides result in an increased molecular weight of the carboxyl-containing polymers with which they are mixed. However, the strength of adhesive bonds produced by means of these dispersions is still unsatisfactory, particularly at elevated temperatures. Furthermore, the pot life of such mixtures is limited.

DE-A-19733044 relates to aqueous dispersions of a polyurethane which carries carbodiimide groups.

DE-A-19828251 describes aqueous dispersions which contain two different types of dispersion particles, the first of which contain polyurethanes having carbodiimide groups or mixtures of polyurethanes and carbodiimides and the second of which contain other polymers having carboxyl groups.

The dispersions prepared according to the two last-mentioned publications comply with the requirement profile for adhesives technology. However, workpieces pretreated with these dispersions have insufficient blocking resistance. Blocking resistance is understood as meaning the property whereby workpieces which were wetted with the dispersion do not stick together or to other articles after drying, with application of only slight pressure. Thus, when they are stacked one on top of the other and the pressure applied to the adhesive surfaces is less than 1 kg/cm$^2$, the prepared workpieces should still be capable of being separated without force even after prolonged storage. Only on application of a pressure of about 0.5 N/mm$^2$, as is typically applied during the adhesive bonding of the pretreated workpieces, should a very strong adhesive bond form.

This substantially simplifies the organization of work in the production of adhesively bonded articles. Only with substantially nonblocking workpieces coated with adhesive is it possible in practice to separate the processing step of adhesive coating from the actual adhesive bonding of the adhesive-coated workpieces in terms of space or time since this requires efficient storage and transport.

It is an object of the present invention to provide a further one-component polyurethane dispersion which does not have the disadvantages of the prior art. It should in particular have a long shelf-life and be further improved with regard to the blocking resistance of the workpieces prepared therewith.

We have found that this object is achieved by the aqueous dispersions defined at the outset.

The disperse phase P.I contains in general from 0.01 to 1, preferably from 0.1 to 0.5, particularly preferably from 0.15 to 0.4, mol of carbodiimide groups per kg of monomers used for the synthesis of the polyurethanes Ia or Ibi and Ibii.

Suitable polyurethanes (Ia) are described, for example, in EP-A-792908.

In principle, all hydrophilic polyurethanes in the synthesis of which monomers having carbodiimide structural units are concomitantly used are suitable as polyurethanes (Ia). The carbodiimide structural units are introduced into the polyurethane (Ia) preferably via polyisocyanates (Ia1.1) containing one or more of the carbodiimide structural units. Such polyisocyanates (Ia1.1) are preferably of the formula Ia1.1.1

$$OCN-(R^c-N=C=N)_n-R^c-NCO \quad (Ia1.1.1)$$

where $R^c$ is a divalent hydrocarbon radical which may have urea, urethane, ester and/or ether groups, as is obtained by removing the isocyanate groups from a simple organic isocyanate or from a prepolymer having urethane groups and, if required, ether or ester groups and carrying terminal isocyanate groups, where, with the presence of a plurality of radicals $R^1$ simultaneously in the same molecule, different radicals $R^1$ corresponding to said definition may also be present, and n is an integer or (as a statistical average) a fraction from 1 to 20, preferably from 2 to 10.

The carbodiimide structural units are introduced into the polyurethane (Ia) particularly preferably via polyisocyanates of the formula Ia1.1.2.

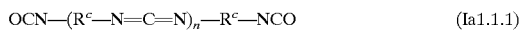
Ia1.1.2 where
$R^a$ is a group of the formula Ia1.1.2.1

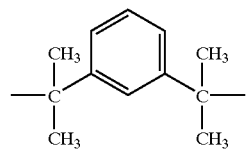
Ia1.1.2.1

$R^b$ is a group of the formula Ia1.1.2.2

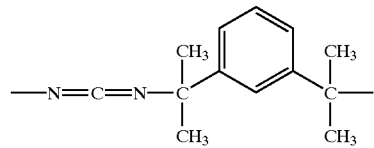
Ia1.1.2.2 and
m is from 1 to 20.

In general, the polyurethanes (Ia) are otherwise composed of
Ia1) diisocyanates which
Ia1.1) contain carbodiimide structural units and, if required, those
Ia1.2) which are free of carbodiimide structural units,
Ia2) diols, of which
Ia2.1) from 10 to 100 mol %, based on the total amount of the diols (b), have a molecular weight of from 500 to 5 000 and
Ia2.2) from 0 to 90 mol %, based on the total amount of the diols (Ia2), have a molecular weight of from 60 to 500 g/mol,
Ia3) monomers differing from the monomers (Ia1) and (Ia2) and having at least one isocyanate group or at least one group reactive toward isocyanate groups, which moreover carry at least one hydrophilic group or one potentially hydrophilic group, which produce water dispersibility of the polyurethanes,
Ia4) if required, further polyfunctional compounds differing from the monomers (Ia1) to (Ia3) and having reactive groups which are alcoholic hydroxyl groups, primary or secondary amino groups or isocyanate groups, and
Ia5) if required, monofunctional compounds differing from the monomers (Ia1) to (Ia4) and having a reactive group which is an alcoholic hydroxyl group, a primary or secondary amino group or an isocyanate group.

Suitable diisocyanatocarbodiimides(Ia1.1) are in particular those of the formula Ia1.1.1 or Ia1.1.2.

Preferably, the radicals $R^c$ in formula Ia1.1.1 are derived by abstraction of the isocyanate groups from monomers (Ia1.2) which are diisocyanates usually used in polyurethane chemistry.

Particular examples of monomers (Ia1.2) are diisocyanates $X(NCO)_2$, where X is an aliphatic hydrocarbon radical of 4 to 12 carbon atoms, a cycloaliphatic or aromatic hydrocarbon radical of 6 to 15 carbon atoms or an araliphatic hydrocarbon radical of 7 to 15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis (4-isocyanatocyclohexyl)methane (HMDI), such as the trans/trans-, the cis/cis- and the cis/trans-isomers, and mixtures consisting of these compounds.

The radicals $R^c$ which are derived by abstraction of the isocyanate groups from a prepolymer having a urethane group, if required ether or ester groups and terminal isocyanate groups are preferably those which are composed of the diols (Ia2) and the diisocyanates (Ia1.2).

The preparation of the monomers (Ia1.1) is known per se and is described, for example, in U.S. Pat. Nos. 2,840,589 and 2,941,966 and EP-A-628 541 and by P. W. Campbell and K. C. Smeltz in Journal of Organic Chemistry, 28 (1963), 2069. Diisocyanatocarbodiimides can also be prepared in a particularly gentle manner free of byproducts by heterogeneous catalysis according to German Laid-Open Applications 2 504 400 and 2 552 350. The carbodiimidization of diisocyanates in the presence of very small amounts of phospholine oxide with subsequent blocking of the catalyst with acid chlorides is described in DE-A 2 653 120.

In general, the diisocyanates (Ia1.2) are used not only for the preparation of the diisocyanates (Ia1.1) but also for the synthesis of the polyurethanes which are contained in novel polyurethane dispersions, since frequently more isocyanate is required for synthesizing the polyurethanes than for introducing the carbodiimide groups.

For the synthesis of the polyurethanes, isocyanates which carry further blocked isocyanate groups, e.g. uretdione groups, in addition to the free isocyanate groups can also be used in addition to the abovementioned isocyanates as compounds (Ia1.2).

With regard to good film formation and resilience, suitable diols (Ia2) are chiefly relatively high molecular weight diols (Ia2.1) which have a molecular weight of from about 500 to 5000, preferably from about 1000 to 3000, g/mol.

The diols (Ia2.1) are in particular polyesterpolyols which are known, for example, from Ullmanns Encyklopädie der technischen Chemie, 4th Edition, Volume 19, pages 62 to 65. Preferably used polyesterpolyols are those which are obtained by reacting dihydric alcohols with dibasic carboxylic acids. Instead of the free polycarboxylic acids, the corresponding polycarboxylic anhydrides or corresponding polycarboxylates of lower alcohols or mixtures thereof can also be used for the preparation of the polyesterpolyols. The polycarboxylic acids may be aliphatic, cycloaliphatic, araliphatic, aromatic or heterocyclic and may be, for example, substituted by halogen atoms and/or unsaturated. Examples of these are suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid and dimeric fatty acids. Dicarboxylic acids of the formula $HOOC-(CH_2)_y-COOH$, where y is from 1 to 20, preferably an even number from 2 to 20, e.g. succinic acid, adipic acid, sebacic acid and dodecanedicarboxylic acid, are preferred.

Examples of suitable polyhydric alcohols are ethylene glycol, propane-1,2-diol, propane-1,3-diol, butane-1,3-diol, butene-1,4-diol, butyne-1,4-diol, pentane-1,5-diol, neopentylglycol, bis(hydroxymethyl)cyclohexanes, such as 1,4-bis(hydroxymethyl)cyclohexane, 2-methylpropane-1,3-diol, methylpentanediols, and furthermore diethylene glycol, triethylene glycol, tetraethylene glycol, polyethylene glycol, dipropylene glycol, polypropylene glycol, dibutylene glycol and polybutylene glycols. Preferred alcohols are those of the formula $HO-(CH_2)_x-OH$, where x is from 1 to 20, preferably an even number from 2 to 20. Examples of these are ethylene glycol, butane-1,4-diol, hexane-1,6-diol, octane-1,8-diol and dodecane-1,12-diol. Neopentylglycol is also preferred.

Polycarbonatediols, as can be obtained, for example, by reacting phosgene with an excess of the low molecular weight alcohols mentioned as components for the polyesterpolyols, are also suitable.

Lactone-based polyesterdiols are also suitable, these being homo- or copolymers of lactones, preferably adducts of lactones with suitable difunctional initiator molecules, which adducts preferably have terminal hydroxyl groups. Preferred lactones are those which are derived from compounds of the formula $HO-(CH_2)_z-COOH$, where z is from 1 to 20 and an H atom of a methylene unit may also be substituted by a $C_1$- to $C_4$-alkyl radical. Examples are epsilon-caprolactone, beta-propiolactone, gamma-butyrolactone and/or methyl-epsilon-caprolactone and mixtures thereof. Suitable initiator components are, for example, the low molecular weight dihydric alcohols stated above as components for the polyesterpolyols. The corresponding polymers of epsilon-caprolactone are particularly preferred. Lower polyesterdiols or polyetherdiols can also be used as initiators for the preparation of the lactone polymers. Instead of the polymers of lactones, the corresponding, chemically equivalent polycondensates of the hydroxycarboxylic acids corresponding to the lactones can also be used.

Other suitable monomers (Ia2.1) are polyetherdiols. They are obtainable in particular by polymerization of ethylene oxide, propylene oxide, butylene oxide, tetrahydrofuran, styrene oxide or epichlorohydrin with themselves, for example in the presence of $BF_3$, or by an addition reaction of these compounds, if required as a mixture or in succession, with initiator components having reactive hydrogen atoms, such as alcohols or amines, e.g. water, ethylene glycol, propane-1,2-diol, propane-1,3-diol, 1,2-bis(4-hydroxydiphenyl)propane or aniline. Polytetrahydrofuran having a molecular weight of from 240 to 5000, especially from 500 to 4500, is particularly preferred.

Polyhydroxyolefins, preferably those having 2 terminal hydroxyl groups, e.g. alpha,omega-dihydroxypolybutadiene, alpha,omega-dihydroxypolymethacrylates or alpha,omega-dihydroxypolyacrylates, are likewise suitable as monomers (Ia2.1). Such compounds are disclosed, for example, in EP-A-0622378. Further suitable polyols are polyacetals, polysiloxanes and alkyd resins.

The polyols can also be used as mixtures in a ratio of from 0.1:1 to 1:9.

The rigidity and the modulus of elasticity of the polyurethanes can be increased if, in addition to the diols (Ia2.1), low molecular weight diols (Ia2.2) having a molecular weight of from about 62 to 500, preferably from 62 to 200, g/mol are also used as diols (Ia2).

In particular, the components of the short-chain alkanediols mentioned for the preparation of the polyesterpolyols are used as monomers (Ia2.2), the straight-chain diols having an even number of from 2 to 12 carbon atoms and pentane-1,5-diol and neopentylglycol being preferred.

Preferably, the amount of the diols (Ia2.1) is from 10 to 100 mol %, based on the total amount of the diols (Ia2), and the amount of the monomers (Ia2.2) is from 0 to 90 mol %, based on the total amount of the diols (Ia2). Particularly preferably, the ratio of the diols (Ia2.1) to the monomers (Ia2.2) is from 0.1:1 to 5:1, particularly preferably from 0.2:1 to 2:1, or virtually no diols (Ia2.2) are used.

In order to achieve the water dispersibility of the polyurethanes, the polyurethanes are composed not only of the components (Ia1) and (Ia2) but also of monomers (Ia3) which differ from the components (Ia1) and (Ia2) and carry at least one isocyanate group or at least one group reactive toward isocyanate groups and moreover at least one hydrophilic group or one group which can be converted into a hydrophilic group. In the text below, the term hydrophilic groups or potentially hydrophilic groups is abbreviated to (potentially) hydrophilic groups. The (potentially) hydrophilic groups react with isocyanates substantially more slowly than the functional groups of the monomers which serve for synthesizing the polymer main chain.

The proportion of the components having (potentially) hydrophilic groups, based on the total amount of the components (Ia1), (Ia2), (Ia3), (Ia4) and (Ia5), is in general such that the molar amount of the (potentially) hydrophilic groups is from 30 to 1000, preferably from 50 to 500, particularly preferably from 80 to 300, mmol/kg, based on the amount by weight of all monomers (Ia1) to (Ia5).

The (potentially) hydrophilic groups may be nonionic or, preferably, (potentially) ionic hydrophilic groups.

Suitable nonionic hydrophilic groups are in particular poly($C_1$- to $C_4$-alkylene) glycol ethers comprising preferably from 5 to 100, especially from 10 to 80, repeating ethylene oxide units. The content of polyethylene oxide units is in general from 0 to 10, preferably from 0 to 6, % by weight, based on the weight of all monomers (Ia1) to (Ia5).

Preferred monomers having nonionic hydrophilic groups are polyethylene oxide diols, polyethylene oxide monools and the reaction products of a polyethylene glycol and a diisocyanate which carry a polyethylene glycol radical etherified at the terminus. Such diisocyanates and processes for their preparation are mentioned in U.S. Pat. Nos. 3,905,929 and 3,920,598.

Ionic hydrophilic groups are in particular anionic groups, such as the sulfonate, the carboxylate and the phosphate group in the form of their alkali metal or ammonium salts, and cationic groups, such as ammonium groups, in particular protonated tertiary amino groups or quaternary ammonium groups.

Potentially ionic hydrophilic groups are in particular those which can be converted by simple neutralization or hydrolysis reactions into the abovementioned ionic hydrophilic groups, e.g. carboxyl groups.

(Potentially) ionic monomers (Ia3) are described in detail, for example, in Ullmanns Encyklopädie der technischen Chemie, 4th Edition, Volume 19, pages 311–313, and, for example, in DE-A 1 495 745.

Monomers having tertiary amino groups are of particular practical importance as (potentially) cationic monomers (Ia3), for example tris(hydroxyalkyl)amines, N,N'-bis(hydroxyalkyl)alkylamines, N-hydroxyalkyl-dialkylamines, tris(aminoalkyl)amines, N,N'-bis(aminoalkyl)alkylamines and N-aminoalkyl-dialkylamines, the alkyl radicals and alkanediyl units of these tertiary amines, independently of one another, consisting of 1 to 6 carbon atoms.

These tertiary amines are converted into the ammonium salts either with acids, preferably strong mineral acids, such as phosphoric acid, sulfuric acid or hydrohalic acids, or strong organic acids, or by reaction with suitable quaternization agents, such as $C_1$- to $C_6$-alkyl halides or benzyl halides, e.g. bromides or chlorides.

Suitable monomers having (potentially) anionic groups are usually aliphatic, cycloaliphatic, araliphatic or aromatic carboxylic acids and sulfonic acids which carry at least one alcoholic hydroxyl group or at least one primary or secondary amino group. Dihydroxyalkanecarboxylic acids, especially those of 3 to 10 carbon atoms, as also described in U.S. Pat. No. 3,412,054, are preferred. In particular, compounds of the formula (Ia3.1)

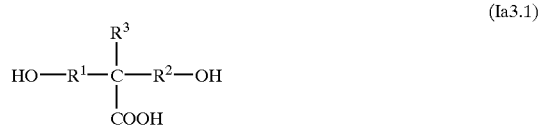

(Ia3.1)

where $R^1$ and $R^2$ are a $C_1$- to $C_4$-alkanediyl unit and $R^3$ is a $C_1$- to $C_4$-alkyl unit, and especially dimethylolpropionic acid (DMPA) are preferred.

Corresponding dihydroxysulfonic acids and dihydroxyphosphonic acids, such as 2,3-dihydroxypropanephosphonic acid, are furthermore suitable.

Other suitable dihydroxy compounds are those having a molecular weight of from more than 500 to 10000 g/mol and at least two carboxylate groups, which are disclosed in DE-A 3 911 827. They are obtainable by subjecting dihydroxy compounds to a polyaddition reaction with tetracarboxylic dianhydrides, such as pyromellitic dianhydride or cyclopentanetetracarboxylic dianhydride, in a molar ratio of from 2:1 to 1.05:1. Particularly suitable dihydroxy compounds are the monomers (IIa2) mentioned as chain extenders and the diols (IIa1).

Suitable monomers (Ia3) having amino groups reactive toward isocyanates are aminocarboxylic acids, such as lysine, β-alanine or the adducts of aliphatic diprimary diamines with α,β-unsaturated carboxylic or sulfonic acids, which adducts are mentioned in DE-A-2034479.

Such compounds are, for example, of the formula (Ia3.2)

$$H_2N-R^4-NH-R^5-X \quad (Ia3.2)$$

where $R^4$ and $R^5$, independently of one another, are a $C_1$- to $C_6$-alkanediyl unit, preferably ethylene, and X is COOH or $SO_3H$.

Particularly preferred compounds of the formula (IV) are N-(2-aminoethyl)-2-aminoethanecarboxylic acid and N-(2-aminoethyl)-2-aminoethanesulfonic acid and the corresponding alkali metal salts, sodium being a particularly preferred opposite ion.

Also particularly preferred are the adducts of the abovementioned aliphatic diprimary diamines with 2-acrylamido-2-methylpropane-sulfonic acid, as described, for example, in German patent 1 954 090.

If monomers having potentially ionic groups are used, they can be converted into the ionic form before, during or, preferably, after the isocyanate polyaddition, since the ionic monomers are frequently only poorly soluble in the reaction mixture. The sulfonate or carboxylate groups are particularly preferably present in the form of their salts with an alkali metal ion or an ammonium ion as the opposite ion.

With the use of monomers (Ia3) having carboxyl groups or those groups which, after dispersing of the polyurethanes, can be converted into the carboxyl groups by hydrolysis reactions or protonation of carboxylate groups, the pH of the novel aqueous dispersion is rendered basic so that substantially no more carboxyl groups are present but said groups have been virtually completely neutralized. This is the case in general at a pH>>pKs, and the following is applicable:

$$pH = pKs - \log c_{acid}/c_{salt}.$$

The pH is preferably at least 8.

The monomers (Ia4) which differ from the monomers (Ia1) to (Ia3) serve in general for crosslinking or for chain extension. They are in general nonphenolic alcohols which are more than dihydric, amines having 2 or more primary and/or secondary amino groups and compounds which, in addition to one or more alcoholic hydroxyl groups, carry one or more primary and/or secondary amino groups.

Alcohols which are more than dibasic and may serve for establishing a certain degree of branching or crosslinking are, for example, trimethylolpropane, glycerol and sugars.

Monoalcohols which, in addition to the hydroxyl group, carry a further group reactive toward isocyanates, such as monoalcohols having one or more primary and/or secondary amino groups, e.g. monoethanolamine, are furthermore suitable.

Polyamines having 2 or more primary and/or secondary amino groups are used particularly when chain extension or crosslinking is to take place in the presence of water, since amines as a rule react more rapidly than alcohols or water with isocyanates. This is frequently required when aqueous dispersions of crosslinked polyurethanes or polyurethanes having a high molecular weight are desired. In such cases, prepolymers having isocyanate groups are prepared, rapidly dispersed in water and then subjected to chain extension or crosslinked by adding compounds having a plurality of amino groups reactive toward isocyanates.

Amines suitable for this purpose are in general polyfunctional amines having a molecular weight range of from 32 to 500, preferably from 60 to 300, g/mol, which contain at least two amino groups selected from the group consisting of the primary and secondary amino groups. Examples of these are diamines, such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate and triamines, such as diethylenetriamine and 1,8-diamino-4-aminomethyloctane.

The amines can also be used in block form, for example in the form of the corresponding ketimines (cf. for example CA-A-1 129 128), ketazines (cf. for example U.S. Pat. No. 4,269,748) or amine salts (cf. U.S. Pat. No. 4,292,226). Oxazolidines, as used, for example, in U.S. Pat. No. 4,192, 937, are also block polyamines which can be used for chain extension of the prepolymers with preparation of the novel polyurethanes. When such block polyamines are used, they are generally mixed with the prepolymers in the absence of water and this mixture is then mixed with the dispersion water or a part of the dispersion water, so that the corresponding polyamines are liberated hydrolytically.

Mixtures of di- and triamines are preferably used, particularly preferably mixtures of isophoronediamine (IPDA) and diethylenetriamine (DETA).

The polyurethanes contain, as monomers (d), preferably from 1 to 30, particularly preferably from 4 to 25, mol %, based on the total amount of the components (Ia2) and (Ia4), of a polyamine having at least 2 amino groups reactive toward isocyanates.

Alcohols which are more than dihydric and may serve for establishing a certain degree of branching or crosslinking are, for example, trimethylolpropane, glycerol or sugars.

Isocyanates having a functionality higher than 2 can also be used as monomers (Ia4) for the same purpose. Commercial compounds are, for example, the isocyanurate or the biuret of hexamethylene diisocyanate.

Monomers (Ia5) which are present if required are monoisocyanates, monoalcohols and monoprimary and monosecondary amines. In general, their amount is not more than 10 mol %, based on the total molar amount of the monomers. These monofunctional compounds usually carry further functional groups, such as olefinic groups or carbonyl groups, and serve for introducing into the polyurethane functional groups which permit the dispersing or the crosslinking or further polymer-analogous reaction of the polyurethane. Monomers such as isopropenyl-alpha,alpha-dimethylbenzyl isocyanate (TMI) and esters of acrylic or methacrylic acid, such as hydroxyethyl acrylate or hydroxyethyl methacrylate, are suitable for this purpose.

The manner in which the molecular weight of the polyurethanes can be established by the choice of the amounts of the monomers reactive with one another and the arithmetic mean of the number of reactive functional groups per molecule is generally known in the area of polyurethane chemistry.

Usually, the components (Ia1) to (Ia5) and their respective molar amounts are chosen so that the ratio A:B, where
A) is the molar amount of isocyanate groups and
B) is the sum of the molar amount of the hydroxyl groups and the molar amount of the functional groups capable of undergoing an addition reaction with isocyanates, is from 0.5:1 to 2:1, preferably from 0.8:1 to 1.5:1, particularly preferably from 0.9:1 to 1.2:1. Very particularly preferably, the ratio A:B is as close as possible to 1:1.

The monomers (Ia1) to (Ia5) used carry on average usually from 1.5 to 2.5, preferably from 1.9 to 2.1, particularly preferably 2.0, isocyanate groups or functional groups capable of undergoing an addition reaction with isocyanates.

The polyaddition of the components (Ia1) to (Ia5) is effected in general at reaction temperatures of from 20 to 180° C., preferably from 50 to 150° C., under atmospheric pressure or under autogenous pressure.

The required reaction times may be from a few minutes to a few hours. The manner in which the reaction time is influenced by a multiplicity of parameters, such as temperature, concentration of the monomers and reactivity of the monomers, is known in the area of polyurethane chemistry.

In order to accelerate the reaction of the diisocyanates, the conventional catalysts, such as dibutyltin dilaurate, tin(II) octanoate or diazabicyclo[2.2.2]octane, may be present.

Suitable polymerization apparatuses are stirred kettles, particularly when a low viscosity and good heat removal are ensured by the presence of solvents.

Preferred solvents are infinitely miscible with water, have a boiling point at atmospheric pressure of from 40 to 100° C. and react very slowly with the monomers, if at all.

Generally, the dispersions are prepared by one of the following processes:

In the acetone process, an ionic polyurethane is prepared from the components (Ia1) to (Ia3) in a water-miscible solvent having a boiling point of less than 100° C. at atmospheric pressure. Water is added until a dispersion forms in which water is the continuous phase.

The prepolymer mixing process differs from the acetone process in that, instead of a final (potentially) ionic polyurethane, a prepolymer which carries isocyanate groups is first prepared. Here, the components are chosen so that the ratio of A:B according to the definition is from greater than 1.0 to 3, preferably from 1.05 to 1.5. The prepolymer is first dispersed in water and then, if required, crosslinked by reacting the isocyanate groups with amines which carry more than 2 amino groups reactive toward isocyanates or subjected to chain extension with amines which carry 2 amino groups reactive toward isocyanates. Chain extension also takes place when no amine is added. In this case, isocyanate groups are hydrolyzed to amino groups, which react with remaining isocyanate groups of the prepolymers with chain extension.

If a solvent was present in the preparation of the polyurethane, the major part of the solvent is usually removed from the dispersion, for example by distillation at reduced pressure. Preferably, the dispersions have a solvent content of less than 10% by weight and are particularly preferably free of solvents.

The dispersions generally have a solids content of from 10 to 75, preferably from 20 to 65, % by weight and a viscosity of from 10 to 500 mPa.s (measured at 20° C. and a shear rate of 250 s$^{-1}$).

Hydrophobic assistants which can be distributed homogeneously in the prepared dispersion sometimes only with difficulty, for example phenol condensation resins obtained from aldehydes and phenol or phenol derivatives or epoxy resins and further polymers mentioned, for example, in DE-A-3903538, 43 09 079 and 40 24 567, which, for example, serve as adhesion promoters in polyurethane dispersions, can be added to the polyurethane or to the prepolymer by the methods described in the two abovementioned publications, even prior to dispersing.

According to a variant of the inventions, the hydrophilic polyurethane Ibi and a carbodiimide Ibii are present in the form of a physical mixture in the disperse phase P.I.

The polyurethane Ibi may have the same composition as the polyurethane Ia, except that the polyurethane Ibi carries no effective amounts of carbodiimide groups.

Accordingly, the polyurethane Ibi is usually composed of

Ibi1) diisocyanates which are free of carbodiimide structural units,

Ibi2) diols, of which

Ibi2.1) from 10 to 100 mol %, based on the total amount of the diols (Ibi2), have a molecular weight of from 500 to 5000 and Ibi2.2) from 0 to 90 mol %, based on the total amount of the diols (Ibi2), have a molecular weight of from 60 to 500 g/mol, Ibi3) monomers differing from the monomers (Ibi1) and (Ibi2) and having at least one isocyanate group or at least one group reactive toward isocyanate groups, which moreover carry at least one hydrophilic group or one potentially hydrophilic group, which produce water dispersibility of the polyurethanes, Ibi4) if required, further polyfucntional compounds differing from the monomers (Ibi1) to (Ibi3) and having reactive groups which are alcoholic hydroxyl groups, primary or secondary amino groups or isocyanate groups, and Ibi5) if required, monofunctional compounds differing from the monomers (Ibi1) to (Ibi4) and having a reactive group which is an alcoholic hydroxyl group, a primary or secondary amino group or an isocyanate group.

Particularly suitable components (Ibi1) are the compounds referred to as (Ia1.2), particularly suitable components (Ib2) are the compounds referred to as (Ia2), particularly suitable components (Ibi3) are the compounds referred to as (Ia3), particularly suitable components (Ibi4) are the compounds referred to as (Ia4) and particularly suitable components (Ibi5) are the compounds referred to as (Ia5).

The carbodiimide Ibii carries substantially no hydrophilic groups which produce water dispersibility, i.e. it carries substantially no ionic groups or hydrophilic polyalkylene oxide radicals as carried by the monomers Ia3 or Ibi3. Suitable carbodiimides Ibii are, for example, those of the formula Ibii1

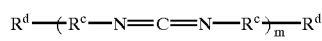

Ibii1 where m is from 2 to 20, $R^c$ is as defined for the formula Ia1.1.1

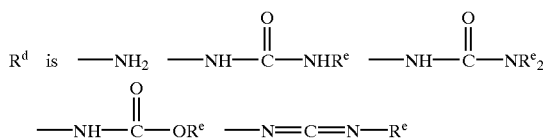

and $R^e$, independently of one another, are $C_1$- to $C_{20}$-alkyl, $C_5$- to $C_{12}$-cycloalkyl, $C_6$- to $C_{20}$-aryl or $C_7$- to $C_{20}$-aralkyl, it being possible for from 1 to 4 hydrogen atoms of the radicals $R^e$ to be substituted by substituents inert to carbodiimide groups.

Among these compounds, those of the formulae Ibii2 and Ibii3

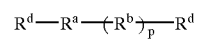

Ibii2 where $R^a$, $R^b$ and $R^d$ have the meanings stated in the formulae Ia1.1.2 and Ibii1 and p is from 2 to 20, and

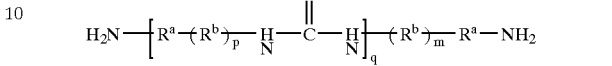

Ibii3 where $R^a$ and $R^b$ have the meanings stated in the formula Ia1.1.2, p is from 2 to 20 and q is from 1 to 10, are preferred.

The carbodiimides Ibii having terminal urea or urethane groups can be prepared, for example, by reacting compounds of the formula Ia1.1.1 with the corresponding alcohols or amines.

Such compounds are known and are described, for example, in EP-A-628 541.

The carbodiimides Ibii having terminal groups of the type —N═C═N—$R^e$ are obtainable by condensing compounds of the formula Ia1.1.1 with the corresponding monoisocyanates or by cocondensing the diisocyanates, from which the compounds of the formula Ia1.1.1 are synthesized, together with the monoisocyanates. Phenyl isocyanate, cyclohexyl isocyanate and m-isopropenyl-alpha,alpha-dimethylbenzyl isocyanate (TMI) are preferred.

The preparation of an aqueous dispersion which contains a disperse phase I in which the polyurethane Ibi and the carbodiimide Ibii are present in the form of a physical mixture can be effected, for example, in the same way as the preparation of the polyurethanes Ia which contain a hydrophobic assistant. This means that the carbodiimide Ibii, if it carries no groups reactive toward isocyanates, such as alcoholic hydroxyl or primary and secondary amino groups, can be added at any desired point in time to the reaction mixture from which the polyurethane Ibi is formed, with the proviso that the admixing is effected before the dispersing of the polyurethane Ibi in water. If the carbodiimide Ibii carries groups reactive toward isocyanates, however, the addition is not effected until after the reaction mixture is completely reacted, i.e. contains virtually no more NCO groups.

It is also possible to use the monomers Ia1.1 instead of the carbodiimides Ibii, provided that they are added after the reaction mixture comprising the monomers Ibi1 to Ibi5 has completely reacted. In this case, the isocyanate groups of the monomers Ia1.1 react with water to give amino groups, and these amino groups may react with further isocyanate groups of further molecules of the monomers Ia1.1 with formation of urea groups to give molecules having extended chains.

Suitable polymers (P) which are contained in the disperse phase (P.II) are polymers which are derived from II.1) from 30 to 99.98, preferably from 50 to 99.8, particularly preferably from 80 to 98, % by weight of main monomers selected from $C_1$- to $C_{20}$-alkyl (meth)acrylates, vinyl esters of carboxylic acids of up to 20 carbon atoms, vinylaromatics of up to 20 carbon atoms, ethylenically unsaturated nitriles, vinyl halides and aliphatic hydrocarbons having 2 to 8 carbon atoms and 1 or 2 double bonds, II.2) from 0.01 to 20, preferably from 0.1 to 10, particularly preferably from 1 to 8, % by weight of a carboxylic acid having an olefinic double bond and II.3) from 0.01 to 10, preferably from 0.1 to 8, particularly preferably from 1 to 5, % by weight of a monomer differing from the monomers II.1 and II.2 and selected from the group consisting of N-methylol (meth) acrylamide (AMOL), (MAMOL), acetoacetoxyethyl (meth)acrylate, diacetone (meth)acrylamide, gycidyl (meth)acrylate, ureido (meth)acrylate and (meth)acrylic anhydride, and II.4) if required, monomers differing from (II.1), (II.2) and (II.3) and capable of free radical polymerization.

In connection with the polymers (IIb), (meth)acryl- is an abbreviation for methacryl- or acryl-.

In order for the polymers P.II to form a disperse phase P.II, the polymers P.II generally have a solubility of less than 1 g/l in the continuous aqueous phase of the novel dispersion at 25° C.

The polymers (II) are preferably composed of the following monomers.

Examples of monomers (II.1) are alkyl (meth)acrylate having a $C_1$–$C_{10}$-alkyl radical, such as methyl methacrylate, methyl acrylate, n-butyl acrylate, ethyl acrylate and 2-ethylhexyl acrylate.

Mixtures of the alkyl (meth)acrylates are also particularly suitable.

Vinyl esters of carboxylic acids of 1 to 20 carbon atoms are, for example, vinyl laurate, vinyl stearate, vinyl propionate and vinyl acetate.

Suitable vinylaromatic compounds are vinyltoluene, alpha- and p-methylstyrene, alpha-butylstyrene, 4-n-butylstyrene, 4-n-decylstyrene and preferably styrene.

Examples of nitriles are acrylonitrile and methacrylonitrile.

The vinyl halides are chlorine-, fluorine- or bromine-substituted ethylenically unsaturated compounds, preferably vinyl chloride and vinylidene chloride.

Examples of nonaromatic hydrocarbons having 2 to 8 carbon atoms and one or two olefinic double bonds are butadiene, isoprene and chloroprene, as well as ethylene, propylene and isobutylene.

The main monomers (II.1) are also preferably used as a mixture.

Vinylaromatic compounds, such as styrene, are frequently used, for example, as a mixture with $C_1$–$C_{20}$-alkyl (meth) acrylates, in particular with $C_1$–$C_8$-alkyl (meth)acrylates, or nonaromatic hydrocarbons, such as isoprene or preferably butadiene.

Preferred monomers (II.2) are (meth)acrylic acid and maleic acid.

Examples of suitable monomers (II.4) are esters of acrylic and methacrylic acid with alcohols of 1 to 20 carbon atoms, which contain at least one further hetero atom in addition to the oxygen atom in the alcohol group and/or which contain an aliphatic or aromatic ring, such as 2-ethoxyethyl acrylate, 2-butoxyethyl (meth)acrylate, dimethylaminoethyl (meth) acrylate, or diethylaminoethyl (meth)acrylate, aryl, alkaryl or cycloalkyl (meth)acrylates, such as cyclohexyl (meth) acrylate, phenylethyl (meth)acrylate or phenylpropyl (meth) acrylate, or acrylates of heterocyclic alcohols, such as furfuryl (meth)acrylate.

Other suitable monomers (II.4) are monomers having amino or amido groups, such as (meth)acrylamide, and their derivatives substituted by $C_1$–$C_4$-alkyl on the nitrogen.

Particularly important monomers (II.4) are monomers having hydroxyl functional groups, e.g. $C_1$–$C_{15}$-alkyl (meth) acrylates, which are substituted by one or two hydroxyl groups. Particularly important comonomers having hydroxyl functional groups are $C_2$–$C_8$-hydroxyalkyl (meth) acrylates, such as hydroxy-n-ethyl, hydroxy-n-propyl or hydroxy-n-butyl (meth)acrylate.

The polymer (II) is prepared by free radical polymerization. Suitable polymerization methods, such as mass, solution, suspension or emulsion polymerization, are known to a person skilled in the art.

Preferably, the copolymer is prepared by solution polymerization with subsequent dispersing in water or particularly preferably by emulsion polymerization.

In emulsion polymerization, the comonomers can be polymerized as usual in the presence of a water-soluble initiator and of an emulsifier at, preferably, from 30 to 95° C.

Suitable initiators are, for example, sodium persulfate, potassium persulfate, ammonium persulfate, tert-butyl hydroperoxide, water-soluble azo compounds and redox initiators.

Emulsifiers used are, for example, alkali metal salts of relatively long-chain fatty acids, alkylsulfates, alkanesulfonates, alkylated arylsulfonates or alkylated diphenyl ether sulfonates. Furthermore, reaction products of alkylene oxides, in particular ethylene oxide or propylene oxide, with fatty alcohols, fatty acids or phenol or alkylphenols are suitable as emulsifiers.

In the case of aqueous secondary dispersions, the copolymer is first prepared by solution polymerization in an organic solvent and then dispersed in water with addition of salt formers, for example of ammonia to carboxyl-containing copolymers, without the use of an emulsifier or dispersant. The organic solvent can be distilled off. The preparation of aqueous secondary dispersions is known to a person skilled in the art and is described, for example, in DE-A-37 20 860.

Chain terminators can be used for establishing the molecular weight. For example, —SH-containing compounds, such as mercaptoethanol, mercaptopropanol, thiophenol, thioglycerol, ethyl thioglycolate, methyl thioglycolate and tert-dodecyl mercaptan are suitable and may additionally be used, for example, in amounts of from 0 to 0.5% by weight, based on the copolymer.

The type and amount of the comonomers is preferably chosen so that the copolymer obtained has a glass transition temperature of from −60 to +140° C., preferably from −60 to +100° C. The glass transition temperature of the copolymer is determined by differential thermal analysis or differential scanning calorimetry according to ASTM 3418/82.

The number average molecular weight $M_n$ is preferably from $10^3$ to $5 \cdot 10^6$, particularly preferably from $10^5$ to $2 \cdot 10^6$ (determined by gel permeation chromatography using polystyrene as a standard).

The novel dispersions can be particularly easily prepared by preparing dispersions which contain the disperse phases (I) and (II) separately, and subsequently mixing them with one another. The mixing is not critical and can be carried out, for example, by stirring one dispersion into the other. The mixing can be effected at any desired point in time prior to their use.

The novel polyurethane dispersions may contain further water-emulsifiable or water-dispersible resins, such as polyurethanes or polyester, epoxy or alkyd resins, and commercial assistants and additives, such as blowing agents, antifoams, emulsifiers, thickeners and thixotropic agents, colorants, such as dyes and pigments. Usually, however, the novel dispersions contain no effective amounts of melamine, kaolin or flameproofing agents.

They are suitable, for example, for the adhesive bonding or coating of various substrates, such as wood, metal, plastics, paper, leather or textile, for the impregnation of textiles and for the production of moldings and printing inks.

The processing of the novel polyurethane dispersions can be carried out by the methods generally customary in the adhesives, leather and coating industries, i.e. by applying the dispersions to the substrate by spraying, roll coating or knife coating and then drying them.

In the case of processing as adhesive, the coated workpieces are united, either before drying of the dispersion film or after drying, with another workpiece, preferably with application of pressure.

Particularly strong adhesive bonds are obtained if workpieces which are provided with a dried adhesive film are heated to a temperature of from about 50 to 100° C. immediately before, during or after being united.

The adhesive bonds produced by these methods are in particular stable to storage and permit the production of adhesive bonds having high heat resistance under load.

Experimental Section

Abbreviations:

| | |
|---|---|
| p = | parts |
| CDI = | carbodiimide groups |
| OHN = | hydroxyl number |
| TDI = | tolylene diisocyanate |
| HDI = | hexamethylene diisocyanate |
| DBTL = | dibutyltin dilaurate |
| DMPA = | dimethylolpropionic acid |
| DE water = | demineralized water |
| RT = | room temperature |

The carbodiimide of the following formula,

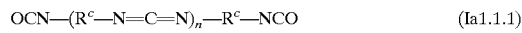

$$OCN-(R^c-N=C=N)_n-R^c-NCO \quad (Ia1.1.1)$$

where m is on statistical average about 4, was used in the examples.

The viscosities of the dispersions were measured at 20° C. and a shear rate of 250s$^{-1}$ using a rotational rheometer having concentric cylinders (spindle diameter 38.7 mm, beaker diameter: 42.0 mm).

The size of the latex particles was determined indirectly via turbidity measurements. For this purpose, the turbidity of a dispersion having a solids content of 0.01% by weight was determined relative to distilled water with a pathlength of 2.5 cm and at room temperature.

$$LD = \frac{\text{Intensity of dispersion} \times 100}{\text{Intensity of water}}$$

Determination of the K Value

The K value is a measure of the molecular weight of a polymer and was determined by the method as described in Kirk-Othmer, Encyclopedia of Chemical Technology, 3rd Edition, Verlag John Wiley & Sons, Inc., volume 23, page 967.

A Preparation of the dispersions

A1 Preparation of the starting dispersions

A1.1 Preparation of the starting dispersions of the type (I)

PREPARATION EXAMPLE 1

720.8 g of a polyester of adipic acid and 1,4-butanediol (OHN=46) and 0.15 g of DBTL in 300 g of acetone were reacted with 70.6 g of HDI for 1 h 48 min at 65° C. Thereafter, dilution was effected with 700 g of acetone and the mixture was cooled to 50° C. The NCO content was 0.6%. Chain extension was effected using 42.2 g of a 50% strength aqueous solution of the sodium salt of aminoethyl-aminoethanesulfonic acid and 40 g of DE water. After 15 minutes, 30 g of an NCO-terminated polycarbodiimide of tetramethylxylylene diisocyanate with 8% of NCO and 15% of CDI were added and dispersed with 1200 g of DE water. The acetone was distilled off under reduced pressure to 43° C. and the solids content was brought to 40%.

Analytical values: Light transmittance: 95 Viscosity: 40 mPa.s K value: 71 pH: 8.7

PREPARATION EXAMPLE 2

720.8 g of a polyester of adipic acid and 1,4-butanediol (OHN=46) and 0.15 g of DBTL in 300 g of acetone were reacted with 70.6 g of HDI for 1 h 46 min at 65° C. Thereafter, dilution was effected with 700 g of acetone and the mixture was cooled to 50° C. The NCO content was 0.6%. Chain extension was effected using 42.2 g of a 50% strength aqueous solution of the sodium salt of aminoethyl-aminoethanesulfonic acid and 40 g of DE water. After 15 minutes, 60 g of an NCO-terminated polycarbodiimide of tetramethylxylylene diisocyanate with 8% of NCO and 15% of CDI were added and dispersed with 1200 g of DE water. The acetone was distilled off under reduced pressure to 43° C. and the solids content was brought to 40%.

Analytical values: Light transmittance: 89 Viscosity: 67 mPa.s K value: 79 pH: 8.7

PREPARATION EXAMPLE 3

720.8 g of a polyester of adipic acid and 1,4-butanediol (OHN=46) and 0.15 g of DBTL in 300 g of acetone were reacted with 70.6 g of HDI for 1 h 58 min at 65° C. Thereafter, dilution was effected with 700 g of acetone and the mixture was cooled to 50° C. The NCO content was 0.55%. Chain extension was effected using 42.2 g of a 50% strength aqueous solution of the sodium salt of aminoethyl-aminoethanesulfonic acid and 40 g of DE water. After 15 minutes, 80 g of an NCO-terminated polycarbodiimide of tetramethylxylylene diisocyanate with 8% of NCO and 15% of CDI in 80 g of acetone were added and dispersed with 1 200 g of DE water. The acetone was distilled off under reduced pressure to 43° C. and the solids content was brought to 40%.

Analytical values: Light transmittance: 86 Viscosity: 36 mPa.s K value: 64 pH: 6.9

A2 Mixing of the Dispersions

The PU dispersions from preparation examples 1–3 were mixed in the ratio 7:3 (solids/solids) with a dispersion having the following composition: mix 1 to mix 3 (according to the invention)

80% of ethyl acrylate
10% of methyl methacrylate
5% of acrylonitrile
4% of methacrylic acid
1% of N-methylolmethacrylamide
Emulsifier: Steinapol NLS
Solids content 40%

The dispersions were also mixed with a dispersion which had the following composition, without N-methylolacrylamide: mix 1c to mix 3c (for comparison)

81% of ethyl acrylate
10% of methyl methacrylate
5% of acrylonitrile
4% of methacrylic acid
Emulsifier: Steinapol NLS
Solids content 40%

B. Testing the Performance Characteristics

B.1 Immediate Peel Strength at Various Pressing Temperatures for Beech Wood/Furniture Veneer

| | |
|---|---|
| Apparatuses: | Spray gun/1.8 mm nozzle |
| | Heatable press |
| | Timer |
| | 500 g weights |
| | Through-circulation oven |
| Substrate: | Beech wood |
| | PVC furniture veneer Roxan ® N 509 Type |
| | 670211 Flex HZ mahogany |
| Dimensions: | 150 × 50 mm |
| Bonding area: | 120 × 50 mm |
| Application: | Spray 70–90 g/m² wet on beech wood |
| Air-drying time: | At least 60 minutes at RT |
| Bonding method: | Hot pressing at 80° C., |
| | furniture veneer side only |
| Pressure: | 0.5 N/mm² |
| Duration of pressing: | 10 s |
| Sample storage: | 3 minutes at 80° C. immediately after lamination |
| Test temperature: | 80° C. |
| Test load: | 500 g to 3000 g |
| Duration of test: | 5 minutes per test load/up to 30 minutes |
| Peeling angle: | 180 degrees |
| Number of samples: | 5 |
| Evaluation: | Measured distance with respective test load |

Procedure

The adhesive (without crosslinking agent) is applied to the beech wood by means of the spray gun. After drying for at least 60 minutes at RT, the furniture veneer is laminated with the beech wood in the press. Immediately after the lamination and subsequent heating (for 3 minutes at 80° C.), the test specimens are subjected to a load at elevated temperatures. The initial load is 500 g. If there is no complete peeling after 5 minutes, the load is increased by a further 500 g in each case after 5 minutes until the furniture veneer is either peeled off over a distance of >20 mm or a total load of 3000 g is reached.

B.2 Static Peel Strength at Elevated Temperatures, Ascending Heat Test for Beech Wood/MDF/Furniture Veneer

| | |
|---|---|
| Apparatuses: | Serrated spatula (1 × 1 mm teeth) |
| | Heatable press |
| | Timer |
| | 1000 g weights |
| | Joint temperature sensor |
| | Through-circulation oven |
| Substrate: | Beech wood/furniture veneer (PVC) |
| Dimensions: | 150 × 50 mm |
| Bonding area: | 100 × 50 mm |
| Application: | With serrated spatula (teeth 1 × 1 mm) |
| | on beech wood in longitudinal direction |
| Air-drying time: | 60 minutes at room temperature |
| Bonding methods: | Hot pressing at a joint temperature of 75–79° C. |
| | Top press plate temperature: about 88° C. |
| Pressure: | 0.5 N/mm² |
| Duration of pressing: | 30 seconds |
| Sample storage: | 1 week at room temperature |
| Test temperature: | 50° C. to 100° C.—in 5° C. steps every 30 minutes |
| Test load: | 1000 g |
| Duration of test: | 30 minutes per test temperature |
| Peeling angle: | 90 degrees |
| Number of samples: | 4 |
| Evaluation: | Peeling distance at the respective test temperature |

Procedure

The adhesive to be tested is applied to the beech wood by means of the serrated spatula in the longitudinal direction. After the air-drying time of 60 minutes at room temperature, the furniture veneer is laminated with the coated side of the beech wood in the press. After the laminated specimens have been stored for 1 week at room temperature, the test specimens are tested with a 1000 g weight at a peeling angle of 90° in a drying oven.

The test begins at 50° C. If there is no complete peeling after 30 minutes, the peeled test distance is marked and the temperature is increased by 5° C. every 30 minutes.

The test is complete when the peeling distance at the respective test temperature is >10 mm or on reaching a temperature of 100° C. or in the event of very considerable elongation of the veneer.

| | |
|---|---|
| Evaluation: | The peeled test distance at the respective temperature should be stated. |

B3 Blocking Resistance

| | |
|---|---|
| Apparatuses: | Spray gun/1.8 mm nozzle |
| | 2 kg weights |
| Substrate: | MDF 150 × 150 mm |
| Bonding area: | 120 × 50 mm |
| Application: | Spray 70–90 g/m² wet onto MDF |
| Air-drying time: | 60 minutes at room temperature |

Procedure

The adhesive is applied to MDF by means of the spray gun. After an air-drying time of 60 minutes, in each case 5 test specimens are stacked one on top of the other and a sixth without adhesive coat is placed on top as a termination. This stack is then loaded with 2 kg. After 24 hours, a check is carried out to determine whether the MDF parts are adhesively bonded to one another.

C Test Results

The test results are summarized in the table below

| Example | Immediate strength | Immediate heat resistance under load | Heat resistance under load after 8 h open time | Blocking resistance |
|---|---|---|---|---|
| Mix 1 | 2.8 kg | 93 | 88 | S |
| Mix 2 | 3.0 kg | 85 | 85 | S |
| Mix 3 | 3.0 kg | 93 | 93 | S |
| Mix 1c | 3.0 kg | 83 | 83 | B |
| Mix 2c | 3.0 kg | 90 | 90 | B |
| Mix 3c | 3.0 kg | 88 | 85 | B |

"C" = Comparative experiment
"S" = Separable without force
"B" = Adhesively bonded The examples and comparative examples show that the novel dispersions are comparable with those of the prior art with respect to immediate strength, heat resistance under load and open time, but have substantial advantages with regard to the blocking resistance.

We claim:

1. A latently crosslinking aqueous polyurethane dispersion, containing
   I) a disperse phase (P.I) containing
      Ia) a polyurethane (Ia) which, in addition to hydrophilic groups which produce water dispersibility, carries carbodiimide groups and substantially no carboxyl groups or
      Ib) a physical mixture of Ibi) a polyurethane (Ibi) which carries hydrophilic groups which produce water dispersibility and carries substantially no carbodiimide or carboxyl groups, and Ibii) a carbodiimide (Ibii) which carries substantially no hydrophilic groups which produce water dispersibility, and II) a disperse phase (P.II) containing another polymer (II) which carries substantially no carbodiimide groups and is substantially derived from II.1) from 30 to 99.98% by weight of main monomers selected from $C_1$- to $C_{20}$ -alkyl (meth)acrylates, vinyl esters of carboxylic acids of up to 20 carbon atoms, vinylaromatics of up to 20 carbon atoms, ethylenically unsaturated nitriles, vinyl halides and aliphatic hydrocarbons having 2 to 8 carbon atoms and 1 or 2 double bonds, (II.2) from 0.01 to 20% by weight of a carboxylic acid having an olefinic double bond and (II.3) from 0.01 to 10% by weight of a monomer differing from the monomers II.1 and II.2 and selected from the group consisting of N-methylol (meth)acrylamide (AMOL), (MAMOL), acetoacetoxyethyl (meth) acrylate, diacetone (meth)acrylamide, glycidyl (meth) acrylate, ureido (meth)acrylate and (meth)acrylic anhydride, and II.4) if required, monomers differing from (II.1), (II.2) and (II.3) and capable of free radical polymerization.

2. An aqueous dispersion as claimed in claim 1, wherein the carbodiimide groups are introduced into the polyurethane (Ia) via polyisocyanates (Ia1) of the formula Ia1.1.1

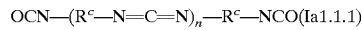

OCN—(R$^c$—N═C═N)$_n$—R$^c$—NCO(Ia1.1.1)

where R$^c$ is a divalent hydrocarbon radical which may have urea, urethane, ester and/or ether groups, as is obtained by removing the isocyanate groups from a simple organic isocyanate or from a prepolymer having urethane groups and, if required, ether or ester groups and carrying terminal isocyanate groups, where, with the presence of a plurality of radicals R$^c$ simultaneously in the same molecule, different radicals R$^c$ corresponding to said definition may also be present, and n is an integer or (as a statistical average) a fraction from 1 to 20.

3. An aqueous dispersion as claimed in claim 1, wherein the carbodiimide groups are introduced into the polyurethane (Ia) via polyisocyanates.(Ia1) of the formula Ia1.1.2

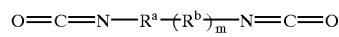

O═C═N—R$^a$—(R$^b$)$_m$—N═C═O     Ia1.1.2 where

R$^a$ is a group of the formula Ia1.1.2.1

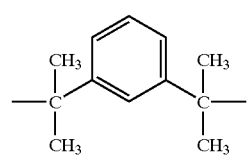

Ia1.1.2.1

R$^b$ is a group of the formula Ia1.1.2.2

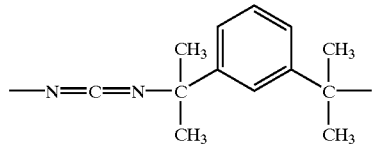

Ia1.1.2.2 and m is from 1 to 20.

4. An aqueous dispersion as claimed in claim 1, wherein the phase (P.I) is substantially formed from a polyurethane (Ia) which comprises Ia 1) diisocyanates which Ia 1.1) contain carbodiimide groups and, if required, those Ia1.2) which are free of carbodiimide groups, Ia2) diols, of which Ia2.1) from 10 to 100 mol %, based on the total amount of the diols (Ia2), have a molecular weight of from 500 to 5000 and Ia2.2) from 0 to 90 mol %, based on the total amount of the diols (Ia2), have a molecular weight of from 60 to 500 g/mol, Ia3) monomers differing from the monomers (Ia1) and (Ia2) and having at least one isocyanate group or at least one group reactive toward isocyanate groups, which moreover carry at least one hydrophilic group or one potentially hydrophilic group, which produce water dispersibility of the polyurethanes, Ia4) if required, further polyfunctional compounds differing from the monomers (Ia1) to (Ia3) and having reactive groups which are alcoholic hydroxyl groups, primary or secondary amino groups or isocyanate groups, and Ia5) if required, monofunctional compounds differing from the monomers (Ia1) to (Ia4) and having a reactive group which is an alcoholic hydroxyl group, a primary or secondary amino group or an isocyanate group.

5. An aqueous dispersion as claimed in claim 1, wherein the polyurethane (Ibi) comprises Ibi1) diisocyanates which are free of carbodiimide groups, Ibi2) diols, of which Ibi2.1) from 10 to 100 mol %, based on the total amount of the diols (Ibi2), have a molecular weight of from 500 to 5000 and Ibi2.2) from 0 to 90 mol %, based on the total amount of diols (Ibi2), have a molecular weight of from 60 to 500 g/mol, Ibi3) monomers differing from the monomers (Ibi1) and (Ibi2) and having at least one isocyanate group or at least one group reactive toward isocyanate groups, which moreover carry at least one hydrophilic group or one potentially hydrophilic group, which produce water dispersibility of the polyurethanes, Ibi4) if required, further polyfunctional compounds differing from the monomers (Ibi1) to (Ibi3) and having reactive groups which are alcoholic hydroxyl groups, primary or secondary amino groups or isocyanate groups, and Ibi5) if required, monofunctional compounds differing from the monomers (Ibi1) to (Ibi4) and having a reactive group which is an alcoholic hydroxyl group, a primary or secondary amino group or an isocyanate group.

6. An aqueous dispersion as claimed in claim 1, wherein the carbodiimide Ibii is one of the formula Ibii1

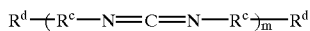  Ibii1 where m is from 2 to 20, $R^c$ is as defined the formula Ia1.1.1

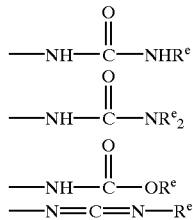

and $R^e$ independently of one another, are $C_1$- to $C_{20}$-alkyl, $C_5$- to $C_{12}$-cycloalkyl, $C_6$- to $C_{20}$-aryl or $C_7$- to $C_{20}$-aralkyl, it being possible for from 1 to 4 hydrogen atoms of the radicals $R^c$ to be substituted by substituents inert to carbodiimide groups.

7. An aqueous dispersion as claimed in claim 5, wherein the carbodiimide Ibii1 is one of the formula Ibii2

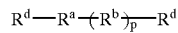  Ibii2 where $R^a$, $R^b$ and $R^d$ have the meanings stated in the formulae Ia1.1.2 and Ibii1 and p is from 2 to 20 or of the formula Ibii3

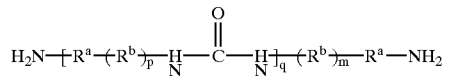  Ibii3 where $R^a$ and $R^b$ have the meanings stated in the formula Ia1.1.2, p is from 2 to 20 and q is from 1 to 10.

8. An aqueous dispersion as claimed in claim 1, wherein the phase (P.II) is substantially formed from a polymer (II) which is derived from $C_1$- to $C_{20}$-alkyl (meth)acrylates and, if required, acrylonitrile as monomers (II.1) and (meth) acrylic acid as monomer (II.2).

9. An impregnating composition, coating material or adhesive containing a dispersion as claimed in claim 1.

10. An article comprising wood, metal, textile, leather or plastic, which has been adhesively bonded, impregnated or coated with an aqueous dispersion as claimed in claim 1.

11. An aqueous dispersion as claimed in claim 2, wherein n is from 2 to 10.

12. A method comprising adhesively binding, impregnating, or coating a substrate selected from the group consisting of wood, metal, textile, leather and plastic, with an aqueous dispersion as claimed in claim 1.

* * * * *